Oct. 15, 1929.        J. J. McCOY        1,731,675
SAWDUST FEEDER
Filed April 16, 1928
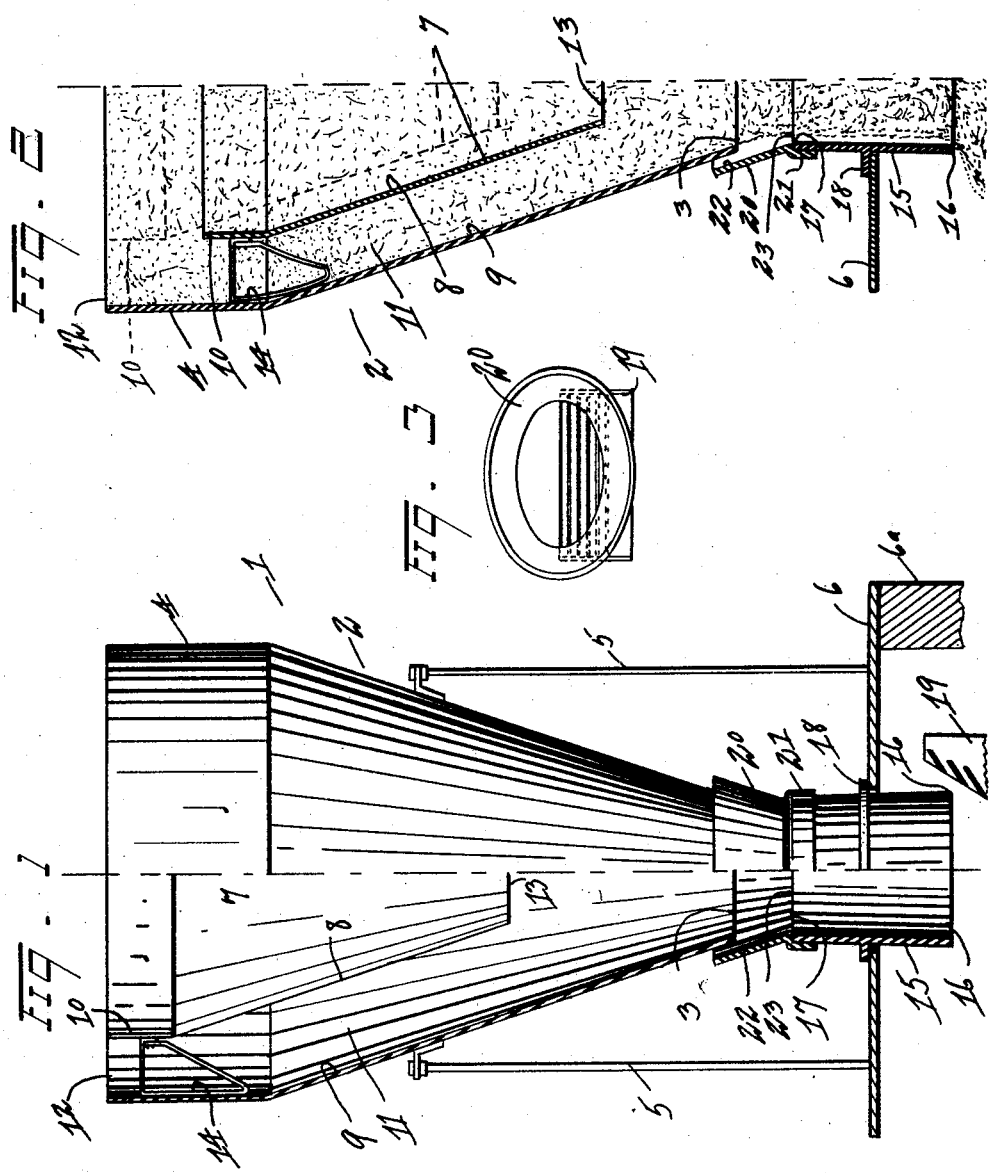
INVENTOR
BY John J. McCoy
ATTORNEY Patented Oct. 15, 1929

1,731,675

UNITED STATES PATENT OFFICE

JOHN J. McCOY, OF MILTON, OREGON

SAWDUST FEEDER

Application filed April 16, 1928. Serial No. 270,246.

This invention relates to sawdust feeders and has as one of its objects to provide a sawdust feeder that is adaptable for use as an automatic feeder of sawdust for any purpose, but more particularly for use as a feeder for sawdust burners.

Another object of the invention is to provide a sawdust feeder that is adaptable to coarse or fine sawdust.

A further object of the invention is to provide a sawdust feeder that will not clog with its natural contents.

A further object of the invention is to provide a sawdust feeder that may be readily relieved of unnatural contents.

With these and other objects in view reference is now had to the accompanying drawings in which Fig. 1 is a side elevation of the sawdust feeder section and showing one position of the control hopper;

Fig. 2 is a sectional elevation of one-half of the sawdust feeder, showing a second position of the control hopper; and Fig. 3 is a plan view of the collar.

Having reference to the drawings like numerals refer to like parts throughout the several views and the numeral 1 refers to the device as a whole, the device consisting of a storage hopper 2 of the shape of a frustrum of a cone, and disposed with its small end down and forming a discharge spout 3, and with its large end provided with a relatively wide extension ring 4.

This storage hopper is supported by legs 5 adjustably attached to the hopper in any suitable manner, and these legs are preferably adapted to stand on the top 6 of a firebox 6ª, as shown in Fig. 1, or other supporting structure.

Adjustably contained within the storage hopper 2 is a control hopper 7 of similar shape to the storage hopper and this hopper is shaped, and is positioned within the storage hopper with its sides 8 paralleling the side walls 9 of the storage hopper, and is provided on its large end with a relatively narrow extension ring 10, of a proportion to the extension ring 4 of the storage hopper of about 1:3, to provide for considerable vertical movement of the control hopper within the storage hopper, and wherewith to provide a varying annular space 11 between the conical part of the hoppers, and at the same time providing a uniformly constant inlet 12, to the storage hopper.

By referring to Fig. 2 of the drawings, this arrangement is clearly shown and it will be noted by reference to this figure that the extension ring 10 of the control hopper, and its side walls 8, are shown to parallel, the extension and side walls of the storage hopper, providing a uniform passageway between the two cones throughout the length of the control cone, then by raising the control hopper, to the position shown by the dotted lines in that figure, it will be further noted that the annular inlet 12 between the two extension rings remains the same, providing a uniformly constant inlet, but that the annular space 11 between the two cones is now increased. By this arrangement the density of the sawdust against the side wall of the storage hopper is controlled, as when the sawdust enters through an opening 12 smaller than its eventual storage space 11 there is a tendency of the sawdust to loosen up and thus provide for its free passage through the storage hopper.

While both hoppers are filled the loosened condition of the sawdust of the storage hopper, as it passes by the discharge spout 13 of the control hopper, allows the control hopper to discharge without obstruction and hence aids in a uniform discharge from both hoppers.

To regulate the position of the control hopper, shoes 14 are provided and these shoes are attached to and disposed about the narrow extension ring of the control hopper, and they are provided with sufficient yielding qualities to frictionally engage the side wall of the storage hopper and secure the control hopper in the position desired.

In further explanation, let it be here understood that with the control hopper down, as shown by the solid lines in Fig. 2, the feeder is in a condition to feed even flour dust, and when the control hopper is raised its limit, it is in a position to properly take care of "hog fuel," a coarse sawdust prepared for burning purposes, hence its adaptability to all kinds of sawdust.

Positioned beneath the storage hopper is a thimble 15, of the relief nature as its lower end 16 is larger than the upper 17, thereby providing for a free movement of the sawdust therethrough.

The thimble is provided with a supporting ring 18 positioned approximately midway of its length and serves as a means of support when the thimble is mounted for use.

Where the feeder is used as a feeder for sawdust burning furnaces, the thimble is mounted in the top plate 6 of the firebox 6ª of the furnace and is positioned slightly to the rear of the grates 19 upon which the sawdust is to be deposited.

The thimble is preferably oval in form and is positioned with respect to the grate with its greater diameter disposed the length ways of that member.

By this means the mass of sawdust rests against the grate so that its lesser dimensions extend in front of the grate, thus enabling the draft, which passes through the grate, to better aid combustion.

As the lower edge 16 of the thimble, which is positioned adjacent to the grate, is subject to a constant and intense heat that may eventually crystallize and consume that part of the thimble, the thimble is made reversible whereby the life of the thimble may be extended.

Mounted on the thimble is a lubricating apron 20 consisting of a flange 21 adapted to conform to and rest upon the top edge 17 of the thimble, and extending upward from the flange is a skirt 22 adapted to receive the discharge end 3 of the storage hopper 2.

The discharge end of the storage hopper is likewise oval in form, the transition from circular to oval taking place preferably in the conical part of the hopper. It must be understood, however, that the apron can be utilized as the transition piece, if deemed advisable, but in either case, the throat 23 of the apron is designed to equal or to be slightly in excess in dimensions to the outlet of the hopper; and the top of the skirt is constructed to provide greater dimensions than the discharge end 3 whereby to provide for an influx of air therebetween to form an air casing about the discharging column of sawdust as it passes through the apron and through the thimble.

This air casing, obviously, surrounds the discharge end of the hopper and follows downward with the descending column being drawn downward by the draft of the firebox, and by this means provides a lubricating means between the column and the side wall of the thimble to aid the flow of sawdust therethrough.

In use the control hopper is adjusted for the grade of sawdust used, and the hoppers are then filled with the fuel.

As above mentioned, the inlet is of uniformly constant dimensions regardless of the position of the control hopper. By this means the sawdust does not enter a wedge shaped cavity to become packed, but enters a space as great or greater than the entrance providing for a loosened condition of the fuel therein.

The fuel in the control hopper being of less cubic dimensions than the whole, the tendency to pack is correspondingly less, and as the loose sawdust about the outside of this hopper is moved past the discharge end of the control hopper, it carries a certain amount of its contents with it and delivers it to the apron in a state of proper compactness to be aided through the thimble by the air casing.

As the sawdust spreads out beneath the thimble, as shown in Fig. 2, it tends to block the discharge until it is removed by consumption.

Having thus described my invention, I claim—

1. A sawdust feeder comprising a storage hopper, a control hopper adjustably contained within said storage hopper, and provided with shoes positioned to frictionally engage the side walls of said storage hopper, and maintain the position of said control hopper, and means to provide an air casing about the discharging column of sawdust.

2. A sawdust feeder comprising a storage hopper, a control hopper adjustably mounted in said storage hopper and adapted to provide a uniformly constant inlet thereto and to provide a varying annular space between said hoppers, and means to provide an air casing about the discharging column of sawdust.

3. A sawdust feeder comprising a storage hopper, a control hopper adjusted in said storage hopper, a thimble, and means to provide an air casing in said thimble about the discharging column of sawdust.

4. A sawdust feeder comprising a storage hopper, a control hopper adjustably mounted in said storage hopper, a reversible relief thimble, and a lubricating apron mounted on said thimble and surrounding the discharge end of said storage hopper, said apron providing for an air casing about the discharging column of sawdust.

5. A sawdust feeder comprising a storage hopper, and a control hopper adjustably mounted in said storage hopper and adapted to provide a uniformly annular space formed by paralleling the walls of said hoppers to control the density of the sawdust against the side wall of said storage hopper.

In testimony whereof I affix my signature.

JOHN J. McCOY.